US012112583B2

(12) United States Patent
Pham et al.

(10) Patent No.: US 12,112,583 B2
(45) Date of Patent: Oct. 8, 2024

(54) AUTOMOTIVE SENSOR CALIBRATION SYSTEM AND RELATED METHODOLOGY

(71) Applicant: Innova Electronics Corporation, Irvine, CA (US)

(72) Inventors: Phuong Pham, Irvine, CA (US); Nha Quang Tran, Tien Giang Province (VN)

(73) Assignee: Innova Electronics Corporation, Irvine, CA (US)

( * ) Notice: Subject to any disclaimer, the term of this patent is extended or adjusted under 35 U.S.C. 154(b) by 368 days.

(21) Appl. No.: 16/952,332

(22) Filed: Nov. 19, 2020

(65) Prior Publication Data
US 2022/0157088 A1 May 19, 2022

(51) Int. Cl.
*G06F 3/048* (2013.01)
*G07C 5/00* (2006.01)
(Continued)

(52) U.S. Cl.
CPC ........... *G07C 5/008* (2013.01); *G07C 5/0808* (2013.01); *G07C 5/0825* (2013.01); *H04L 67/12* (2013.01);
(Continued)

(58) Field of Classification Search
CPC .... G07C 5/008; G07C 5/0808; G07C 5/0825; H04L 67/12; H04N 9/3147; H04N 1/00408; H04N 1/00506; H04N 2201/0094; G06F 3/0482; G06F 3/0488; G06F 3/04847; G06F 3/04855; G06F 2203/04803; G06T 7/80; G01B 11/272;
B60R 11/04; B60R 2300/402; G01S 13/931; G01S 17/931; G01S 7/4021; G01S 7/4972; G01S 7/497; G01S 7/003; B60W 30/09
See application file for complete search history.

(56) References Cited

U.S. PATENT DOCUMENTS

2018/0081857 A9 * 3/2018 Chen ....................... G06Q 50/30
2018/0100783 A1   4/2018 Stieff et al.
(Continued)

OTHER PUBLICATIONS

Auteltools, Autel ADAS Live calibrations walk through training and demonstration, May 22, 2020, YouTube, https://www.youtube.com/watch?v=xRE8am9iXWA (Year: 2020).*

*Primary Examiner* — Mohamed Abou El Seoud
(74) *Attorney, Agent, or Firm* — Stetina Brunda Garred & Brucker

(57) ABSTRACT

A method of calibrating an Advanced Driver Assistance System (ADAS) sensor on a vehicle includes receiving a signal at a handheld vehicle diagnostic tool from an onboard vehicle computer, with the signal including a list of ADAS sensors located on the vehicle. The list is displayed on the diagnostic tool and user input is received on the diagnostic tool identifying a selected ADAS sensor from the list. Calibration instructions associated with the selected ADAS sensor are displayed in response to receiving the user input. An image is projected onto a projection surface adjacent the vehicle, with the projected image being associated with calibrating the selected ADAS sensor. Computer executable instructions are executed on the diagnostic tool to autonomously calibrate the selected ADAS sensor using the projected image in response to receipt of the user input and projecting the image onto the projection surface.

22 Claims, 6 Drawing Sheets

(51) Int. Cl.
*G07C 5/08* (2006.01)
*H04L 67/12* (2022.01)
*H04N 9/31* (2006.01)
G06F 3/0482 (2013.01)
G06F 3/0488 (2022.01)

(52) U.S. Cl.
CPC ......... *H04N 9/3147* (2013.01); *G06F 3/0482* (2013.01); *G06F 3/0488* (2013.01)

(56) References Cited

U.S. PATENT DOCUMENTS

2019/0118662 A1* 4/2019 Anzicek ................ G08B 25/08
2019/0236862 A1* 8/2019 Mercep ................ G08G 1/165
2019/0392610 A1 12/2019 Cantadori et al.

\* cited by examiner

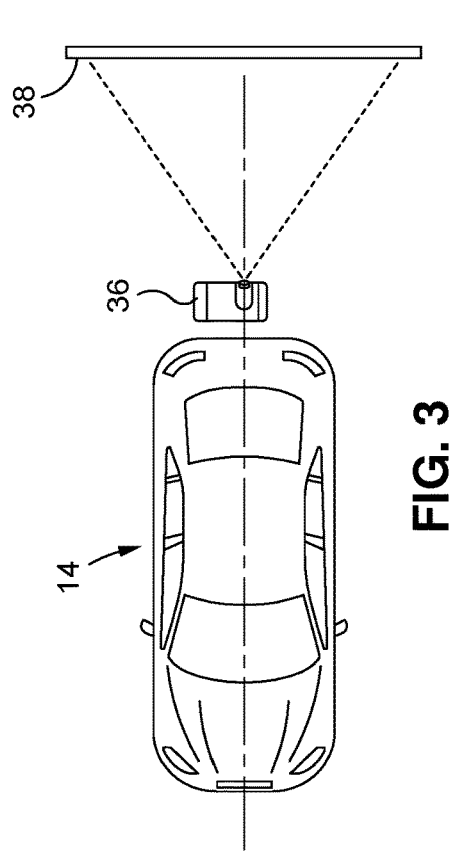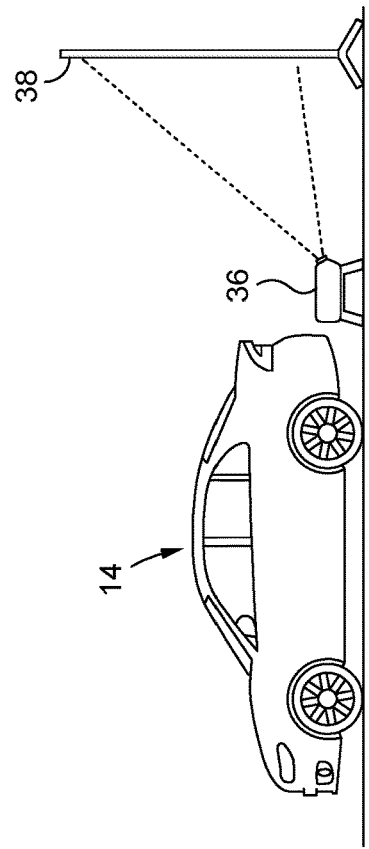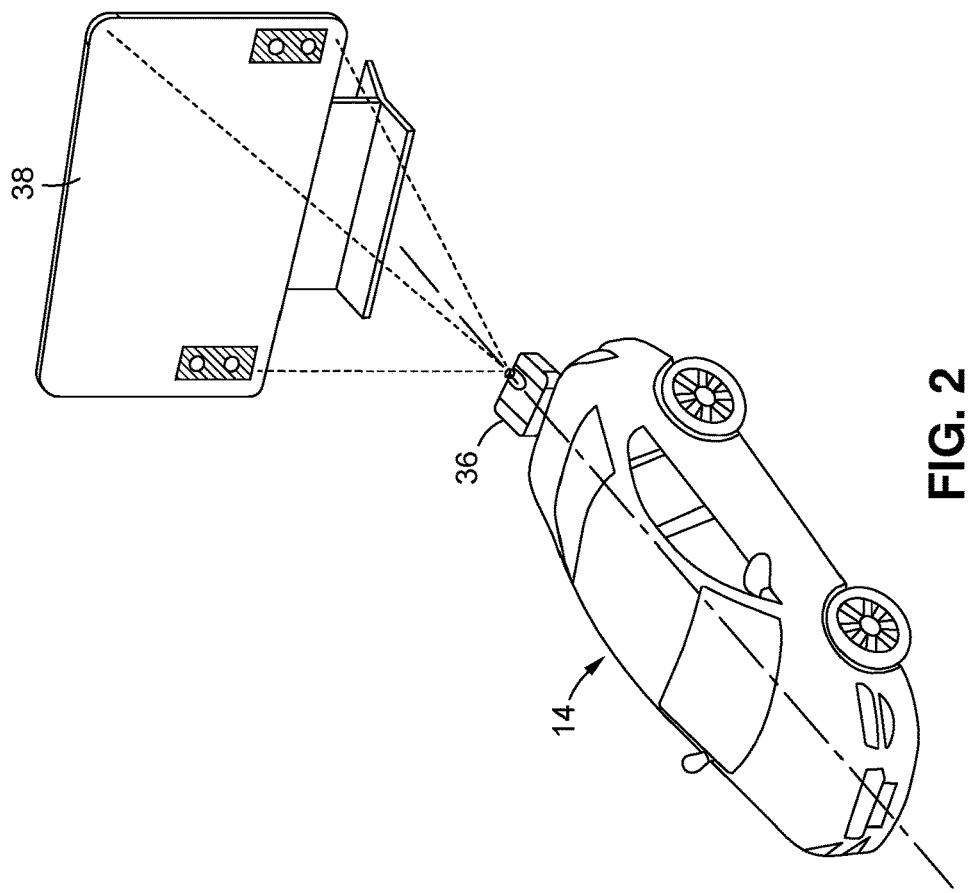
FIG. 3
FIG. 4
FIG. 2

AUTOMOTIVE SENSOR CALIBRATION SYSTEM AND RELATED METHODOLOGY

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to sensor calibration on a vehicle, and more specifically to calibration of sensors associated with a vehicle's Advanced Driver Assistance System (ADAS).

2. Description of the Related Art

Many vehicles manufactured in recent years include driver safety systems aimed at increasing vehicle safety, and more generally, road safety. An exemplary driver safety system on a vehicle is an Advanced Driver Assistance System (ADAS), which is an electronic system aimed at providing assistance or alerts to the driver while driving or parking the vehicle. Human error plays a role in many road accidents, and thus, an objective of ADAS may be automating, adapting, and enhancing vehicle systems to mitigate human error. ADAS may include Lane Departure Warning (LDW), Adaptive Cruise Control (ACC), Night Vision System (NVS), Around View Monitoring (AVM), Blind Spot Detection (BSD), Rear Collision Warning (RCW), Traffic Signals Recognition (TSR), and Head Up Display (HUD). Adaptive features provided by ADAS may automate lighting, provide adaptive cruise control and collision avoidance, implement pedestrian crash avoidance mitigation (PCAM), incorporate satellite navigation warnings and traffic warnings, alert drivers to other vehicles or obstructions, automate lane centering, provide blind spot alerts, or connect smartphones to the vehicle's infotainment center for navigation instructions.

Many ADAS rely on inputs from a variety of sensors that allow the vehicle's onboard systems to know what is happening around the vehicle, e.g., become aware of adjacent vehicles, pedestrians, obstacles, etc. Common ADAS inputs includes cameras, radar, ultrasonic sensors, and steering sensors. Some vehicle safety systems use information or data from a single type of sensor, while other vehicle safety systems combine information from multiple sensors, which may be referred to as sensor fusion, to obtain a more accurate or comprehensive view of the situation.

The accuracy of many vehicle safety systems, and in particular, the accuracy of the data provided by the system input devices may become affected by mechanical alignment adjustments. As a result, many vehicle manufacturers require ADAS sensor calibration whenever a sensor's capability is disturbed. Failure to calibrate a sensor when necessary may result in faulty information that may lead to improper operation of ADAS. Calibration may also required whenever a sensor or its mounting bracket is removed or replaced, when the tire size of the vehicle changes, a front airbag deploys, a windshield is replaced, or repairs are made to a vehicle roof that has a sensor bracket mounted thereto.

Many conventional ADAS calibration techniques may be limited to calibration of sensors in a specific region or zone of the vehicle, such as the ADAS sensors at the front of the vehicle. In this regard, conventional ADAS calibration techniques may not be applicable to sensors located throughout the vehicle. Furthermore, conventional ADAS calibration techniques may be vary labor intensive, and thus, may be associated with high cost and long turnaround times. In this regard, technicians may need to access various resources for specific calibration instructions related to a particular sensor.

Accordingly, there is a need in the art for calibration systems and methods to provide ADAS calibration to sensors throughout the vehicle. There is also a need in the art calibration systems and methods that may implement one or more steps autonomously. Various aspects of the present disclosure address this particular need, as will be discussed in more detail below.

BRIEF SUMMARY

In accordance with one embodiment of the present disclosure, there is provided a method of calibrating an Advanced Driver Assistance System (ADAS) sensor on a vehicle. The method includes receiving a signal at a handheld vehicle diagnostic tool from an onboard vehicle computer, with the signal including a list of ADAS sensors located on the vehicle. The method also includes displaying the list of ADAS sensors on a display of the handheld vehicle diagnostic tool. A user input is received on the handheld vehicle diagnostic tool identifying a selected ADAS sensor from the list of ADAS sensors displayed on the display. Calibration instructions associated with the selected ADAS sensor are displayed in response to receiving the user input. The method further includes projecting an image onto a projection surface adjacent the vehicle, with the projected image being associated with calibrating the selected ADAS sensor. The method additionally comprises executing computer executable instructions on the handheld vehicle diagnostic tool to autonomously calibrate the selected ADAS sensor using the projected image in response to receipt of the user input and projecting the image onto the projection surface.

The method may also include receiving diagnostic data from the vehicle at the handheld vehicle diagnostic tool and analyzing the diagnostic data to identify at least one ADAS sensor requiring calibration. The at least one ADAS sensor requiring calibration may be visually identified on the display of the handheld diagnostic tool.

The projecting step may include projecting the image onto a projection surface adjacent a side of the vehicle. The projecting step may include projecting the image onto a projection surface adjacent a rear of the vehicle.

The step of displaying calibration instructions may include displaying instructions associated with positioning of a projection screen relative to the vehicle. The step of displaying calibration instructions includes displaying instructions associated with displaying the image.

The method may also include the step of selecting an image from an image library based on the selected ADAS sensor. The step of selecting an image may occur autonomously in response to receiving the user input on the handheld vehicle diagnostic tool identifying the selected ADAS sensor.

The method may additionally include the step of generating a completion signal in response to the selected ADAS sensor meeting a prescribed calibration threshold.

The selected ADAS sensor and an adjacent ADAS sensor may be operable in concert with each other to facilitate a prescribed functionality. The method may additionally comprise the step of analyzing vehicle data associated with the secondary ADAS sensor to determine whether the secondary ADAS sensor meets a predetermined calibration parameter.

The method may include the step of identifying a secondary ADAS sensor operatively associated with the selected ADAS sensor. The method may include displaying calibration instructions associated with the secondary ADAS sensor in response to receiving the user input, projecting a secondary image onto a secondary projection surface adjacent the vehicle; and executing computer executable instruction on the handheld vehicle diagnostic tool to calibrate the secondary ADAS sensor using the projected secondary image. The secondary ADAS sensor may be adjacent the selected ADAS sensor on the vehicle. The secondary ADAS sensor may be identified as being associated with the selected ADAS sensor due to data from the secondary ADAS sensor and the selected ADAS being collectively assessed to determine a specific vehicle parameter. The specific vehicle parameter may be a distance between the vehicle and an adjacent object.

According to another aspect of the present disclosure, there is provided a system for calibrating an Advanced Driver Assistance System (ADAS) sensor on a vehicle. The system includes a handheld automotive diagnostic device connectable with the vehicle to communicate with an onboard vehicle computer, and a set of computer executable instructions downloadable onto the handheld automotive diagnostic device. The computer executable instructions configure the handheld automotive diagnostic device to generate a request for a list of ADAS sensors from the vehicle, and receive a signal at the handheld vehicle diagnostic tool from an onboard vehicle computer, with the signal including the list of ADAS sensors located on the vehicle. The computer executable instructions further configure the handheld automotive diagnostic device to display the list of ADAS sensors on a display of the handheld vehicle diagnostic tool, and receive a user input on the handheld vehicle diagnostic tool identifying a selected ADAS sensor from the list of ADAS sensors displayed on the display. The computer executable instructions additionally configure the handheld automotive diagnostic device to display calibration instructions associated with the selected ADAS sensor in response to receiving the user input, generate a command signal for a projector to project an image onto a projection surface adjacent the vehicle, with the projected image being associated with calibrating the selected ADAS sensor. The computer executable instructions also configure the handheld automotive diagnostic device to autonomously calibrate the selected ADAS sensor using the projected image in response to receipt of the user input and projecting the image onto the projection surface.

The computer executable instructions may further configure the handheld automotive diagnostic device to receive diagnostic data from the vehicle at the handheld vehicle diagnostic tool, and analyze the diagnostic data to identify at least one ADAS sensor requiring calibration.

The handheld automotive diagnostic device may include a non-transitory computer readable medium on which the computer executable instructions are stored and which are executable by a processor.

According to another embodiment of the present disclosure, there is provided a kiosk for calibrating an Advanced Driver Assistance System (ADAS) sensor on a vehicle. The kiosk includes a housing and a proximity sensor coupled to the housing and capable of detecting a position of the vehicle relative to the proximity sensor. The kiosk further includes a diagnostic connector connected to the housing and connectable with the vehicle to communicate with an onboard vehicle computer for receiving a list of ADAS sensors from the vehicle. A user interface is also coupled to the housing and is configured to display the list of ADAS sensors received from the vehicle, receive user input identifying a selected ADAS sensor from the list of ADAS sensors, and display calibration instructions associated with the selected ADAS sensor. A projector is connected to the housing and is configured to project an image onto a projection surface adjacent the vehicle, with the projected image being associated with calibrating the selected ADAS sensor. The diagnostic connector is further configured to transmit calibration commands to the onboard vehicle computer in response to receipt of the user input and the image being projected onto the projection surface.

The user interface may be a touch screen display.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 2 is an upper perspective view of a vehicle undergoing calibration of a rear ADAS sensor;

FIG. 3 is a top view of the vehicle undergoing calibration of the rear ADAS sensor;

FIG. 4 is a side view of the vehicle undergoing calibration of the rear ADAS sensor;

Common reference numerals are used throughout the drawings and the detailed description to indicate the same elements.

DETAILED DESCRIPTION

The detailed description set forth below in connection with the appended drawings is intended as a description of certain embodiments of various systems and methods of calibrating an Advanced Driver Assistance System (ADAS) sensor and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
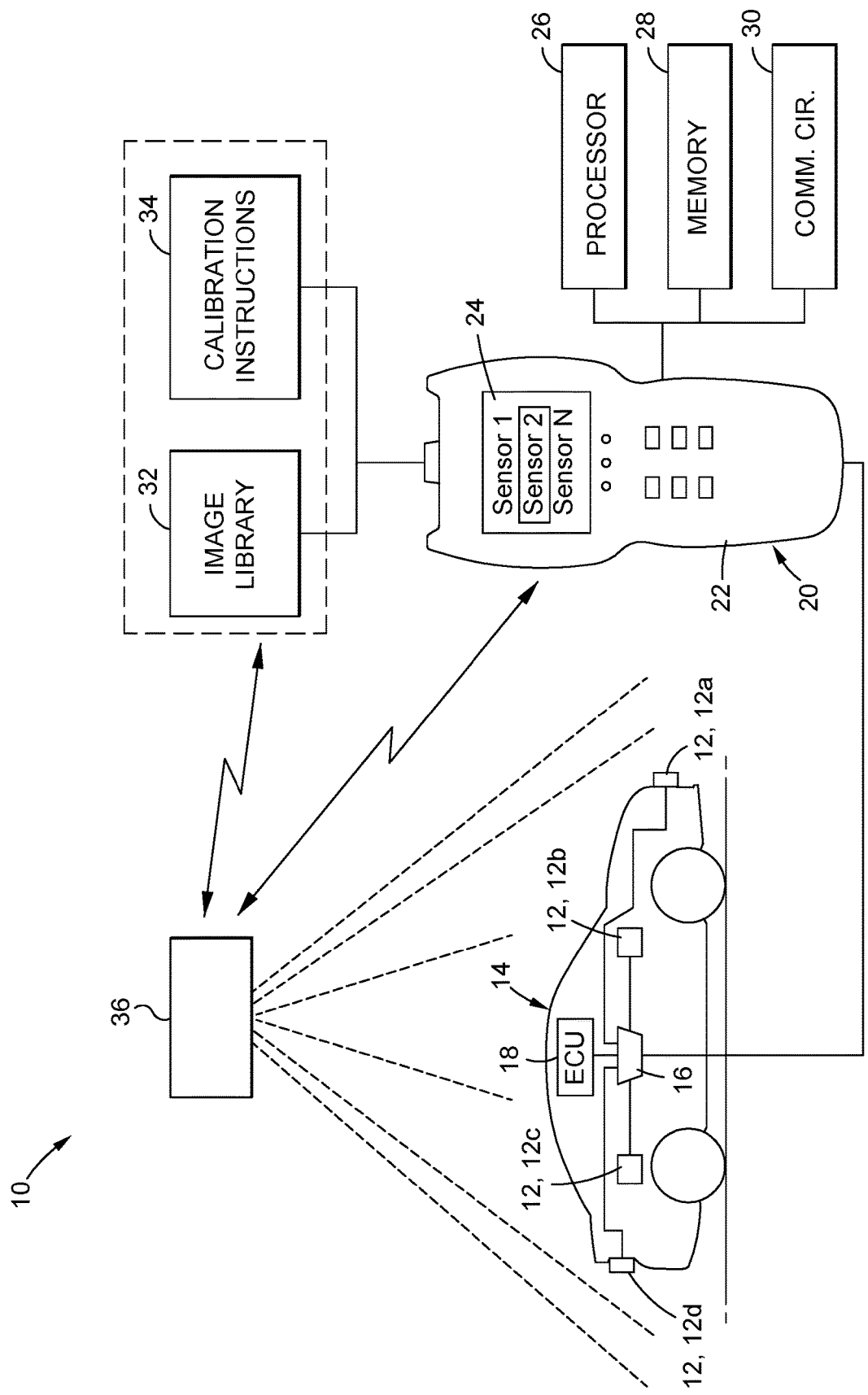
FIG. 1 is a schematic view of a system for calibrating an Advanced Driver Assistance System (ADAS) sensor on a vehicle.

Referring now to FIG. 1, there is depicted a schematic view of a system 10 for calibrating an ADAS sensor 12 on a vehicle 14. The word sensor, as used herein, may refer broadly to any hardware that may obtain information about the environment around the vehicle 14, as well as information about the vehicle 14 itself. In this regard, the word sensor may refer to, but is not limited to, cameras, radar, ultrasonic sensors, and steering sensors. Sensor 12 calibration may be necessary when a sensor 12 is replaced, the sensor mounting hardware (e.g., mounting bracket or housing) is replaced, there is a related diagnostic trouble code (DTC) in the vehicle's computer memory, a warning light or message is displayed on the vehicle's instrument panel, the wheels are realigned, or an automaker releases a technical service bulletin with instructions that calibration be done as part of another repair.

The vehicle 14 depicted in FIG. 1 includes several ADAS sensors 12, including a front sensor 12a, side sensors 12b, 12c, and a rear sensor 12d. Examples of front sensors 12a include those related to adaptive cruise control, forward collision warning, automatic emergency brake, lane keeping assist, lane departure warning, night vision system, etc. Examples of side sensors 12b, 12c include those related to blind spot detection, around view monitoring systems, etc. Examples of rear sensors 12d include those related to parking assist systems, rear collision warning, around view monitoring etc. The vehicle 14 also includes a diagnostic port 16 which is in communication with an onboard vehicle computer 18. The diagnostic port 16 may be an OBD-II diagnostic port. The ADAS sensors 12 may be in operative communication with the onboard vehicle computer 18, such that operational data associated with the ADAS sensors 12 may be accessible via the onboard vehicle computer 18, and calibration of the sensors 12 may be facilitated, at least in part, through communication via the onboard vehicle computer 18, as will be described in more detail below.

The system 10 additionally includes a handheld vehicle diagnostic tool 20 that is operatively connectable to the onboard vehicle computer 18. In one embodiment, the handheld vehicle diagnostic tool 20 includes a connector that is plug connectable to the diagnostic port 16 on the vehicle 14 to create a wired communication pathway between the handheld vehicle diagnostic tool 20 and the onboard vehicle computer 18. However, it is also contemplated that communication between the handheld vehicle diagnostic tool 20 and the onboard vehicle computer 18 may include wireless communications.

The diagnostic tool 20 additionally includes a body 22 and a display screen 24 coupled to the body 22. The display screen 24 may be a touch screen display or may be operatively associated with one or more buttons to define a user interface. The diagnostic tool 20 may further include a processor 26 and a memory circuit 28 to facilitate operation of the diagnostic tool 20. In this regard, the memory circuit 28 may be capable of at least temporarily storing diagnostic data retrieved from the vehicle 14, as may be needed to calibrate one or more ADAS sensors 12. The memory circuit 28 may also include computer executable instructions (e.g., software) that are either preloaded thereon, or downloadable thereon. The diagnostic tool 20 may also include a communications circuit 30 to allow for communication with a remote device, such as a server to retrieve the downloadable software, or other remote resources that may be needed to facilitate the ADAS calibration described below. The communications circuit 30 may be capable of wired or wireless communications between the diagnostic tool 20 and the remote resource. In the case of wireless communications, the communication circuit 30 may be capable of facilitating communication via Bluetooth, WiFi, cellular network protocols, etc.

The diagnostic tool 20 may also be in communication with an image library 32 comprised of images used in calibrating ADAS sensors 12, as well as calibration instructions 34 used to calibrate the ADAS sensors 12, as will be described in more detail below. Each ADAS sensor 12 may be associated with a different or specific image needed for calibration. The image library 32 and calibration instructions 34 may be stored internally on diagnostic tool 20 or remotely, such as on a remote server. When stored remotely, the image library 32 and calibration instructions 34 may be accessed by the tool 20. The calibration instructions 34 may relate to how to set up a projector and the projection screen (e.g., the position and distance), the image needed for calibration, how to adjust the position and size of the image, etc.

The system 10 additionally includes one or more projectors 36 for projecting an image, a sequence of images, a video, etc., on a projection surface adjacent the vehicle 14. The projector(s) 36 may be arranged and configured to project images onto the ground adjacent the vehicle 14 (e.g., a horizontal surface), or onto a screen (e.g., a vertical surface) adjacent the vehicle 14, such as in front of the vehicle or behind the vehicle. A tape measure may be required to set up the projector and the projection screen in accordance with the calibration instructions displayed on the diagnostic tool 20. In one embodiment, the diagnostic tool 20 may include a hardware and software to provide measurements to facilitate placement of the projector or projector screen. The hardware and software may utilize augmented reality to determine distances, similar to the Measure™ app developed by Apple®. Other measuring technologies, such as laser distance measuring, digital measuring tapes, etc., may also be incorporated into the diagnostic tool 20.

With the basic architecture of the system 10 having been described above, the following discussion relates to an exemplary use of the system 10. The vehicle 14 may be driven into an ADAS calibration working area, e.g., a garage or other facility that is configured for ADAS testing and calibration. In this regard, the facility may have sufficient space around the vehicle 14 to project images onto the floor around the vehicle 14. It is also contemplated that the facility may have one or more screens or other vertical surfaces for projecting images onto the vertical surface. The surfaces (horizontal or vertical) may be of a particular color (e.g., white, gray, black, etc.) that may be suitable for conducting the ADAS recalibration.

A user may connect the diagnostic tool 20 to the diagnostic port 16 on the vehicle to establish a communication pathway between the diagnostic tool 20 and the onboard vehicle computer 18. The calibration process may require that the vehicle engine is turned on. The diagnostic tool 20 may be turned on and the diagnostic tool 20 may send a request to the onboard vehicle computer 18 for a list of ADAS sensors located on the vehicle 14. Upon receiving the request, the onboard vehicle computer 18 may compile the list and transmit a signal to the diagnostic tool 20 that includes the list. As used herein, the term list may refer to any compilation or arrangement of the sensors 12 included on the vehicle 14. The list may include all of the sensors 12 on the vehicle or only a subset of the sensors 12. For instance, the list may include only the front sensors 12*a*, or only the rear sensors 12*d*, or only the side sensors 12*b*, 12*c*, or only sensors 12 associated with a particular functionality, or sensors 12 linked via another parameter.

Upon receiving the list from the vehicle 14, the diagnostic tool 20 may automatically display the list of ADAS sensors 12 on the display 24. The list depicted on the display 24 may identify the sensors 12 by the location on the vehicle 14, e.g. driver's side fender sensor, passenger side bumper sensor. It is also contemplated that the list may identify the sensor by the functionality of the sensor, e.g., front camera of lane keeping assist, radar of automatic emergency brake, etc. The list may include some other identifier, e.g., an alphanumeric code, from which the user may be able to identify one sensor from the others. For instance, a user's manual for the vehicle or other manufacturer's resource may provide a key for using alphanumeric codes matched with particular ADAS sensors 12.

The user may navigate the user interface to select one or more ADAS sensors 12 for calibration. Oftentimes, sensor calibration is required whenever a sensor's aiming is disturbed, a sensor is removed or replaced, there is a change in tire size, or the windshield is replaced. Thus, for example, if a particular ADAS sensor 12 is replaced, the user would navigate the user interface to identify the replaced sensor 12*a* for calibration. Upon finding the particular sensor 12 in the list, a user may select the sensor 12. If the display 24 is a touch screen display, the diagnostic tool 20 may be configured to allow the user to tap on the name or other identifier associated with the sensor 12 to select the sensor 12. When the diagnostic tool 20 includes buttons to navigate through the list, the user may use the buttons to highlight the particular sensor 12, and then select the sensor 12.

In addition to allowing the user to select the ADAS sensor 12 for calibration, it is also contemplated that calibration may be determined in response to analyzing diagnostic data from the vehicle 14. In this regard, various aspects of the ADAS calibration process may include receiving diagnostic data from the vehicle 14 at the handheld vehicle diagnostic tool 20 and analyzing the diagnostic data to identify at least one ADAS sensor 12 requiring calibration. Once one or more ADAS sensors 12 requiring calibration are identified through the data analysis, such ADAS sensors 12 may be visually identified on the display 24 of the handheld diagnostic tool 20. For instance, the sensors needing calibration may be displayed separately from those that may not require calibration, or the sensors needing calibration may be highlighted on the list displayed on the diagnostic tool 20. It is also contemplated that if the analysis of diagnostic data reveals one or more ADAS sensors 12 requiring calibration, the tool 20 may be configured to automatically select those sensors for calibration. In this respect, no user input may be required when the sensors 12 are autonomously selected by the tool 20.

Once the particular sensor 12 is selected, either through user input or analysis of diagnostic data, the library or database of calibration instructions 34 may be accessed to identify the calibration instructions associated with the selected sensor 12. In this regard, the database of calibration instructions 32 may include particular calibration instructions mapped to particular ADAS sensors 12. Accessing the database of calibration instructions 32 may proceed autonomously in response to selection of the ADAS sensor 12.

An image, or sequence of images, may be selected from the image library 32 based on the selected ADAS sensor 12. The calibration instructions associated with the selected ADAS sensor 12 may indicate which image(s) should be selected. The selection of the image may occur autonomously in response to selection of the selected ADAS sensor 12.

The selected image may be projected onto a projection surface adjacent the vehicle 14, with the projected image being associated with calibrating the selected ADAS sensor 12. Depending on which ADAS sensor(s) 12 requiring calibration, the projection surface may be in front of the vehicle 14, behind the vehicle 14, or on the side of the vehicle 14. Furthermore, the projection surface may be horizontal (e.g., the floor), vertical (e.g., a wall or screen), or at a prescribed angle.

Computer executable instructions downloadable onto the handheld vehicle diagnostic tool 20 may be executed on the handheld vehicle diagnostic tool 20 to autonomously calibrate the selected ADAS sensor 12 using the projected image. A completion signal may be generated by the tool 12 in response to the selected ADAS sensor 12 meeting a prescribed calibration threshold. The completion signal may be a visual signal, an audible signal, or both.

Referring now specifically to FIGS. 2-4, there is shown an exemplary depiction of a vehicle 14 undergoing calibration of a rear ADAS sensor 12*d*. In this example, a projector 36 is projecting an image onto a screen 38 positioned behind the vehicle 14. The image projected onto the screen 38 includes a pair of quadrangular shapes with each quadrangle having a pair of circles therein.

Figure 6:
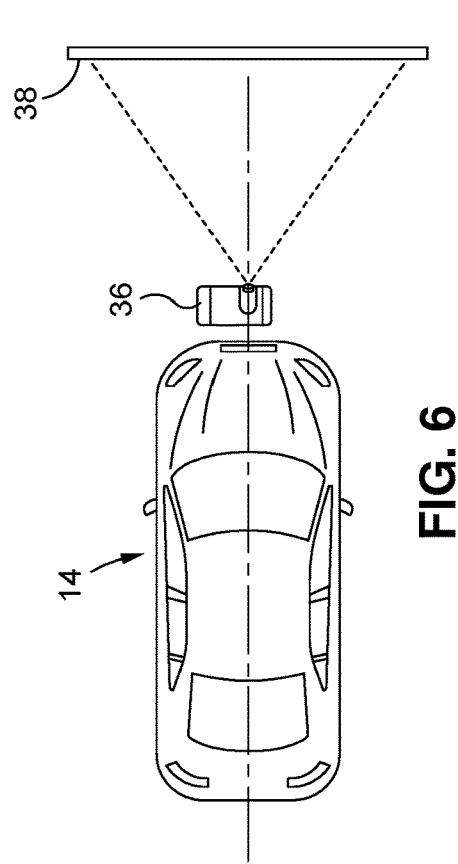
FIG. 6 is a top view of the vehicle undergoing calibration of the front ADAS sensor.
Figure 7:
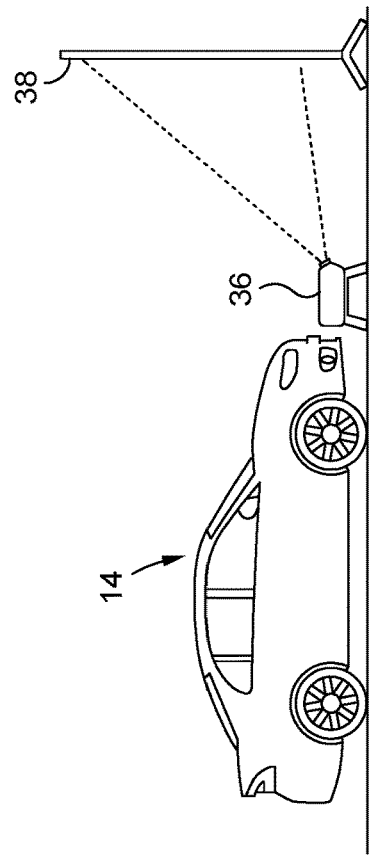
FIG. 7 is a side view of the vehicle undergoing calibration of the front ADAS sensor.
Figure 5:
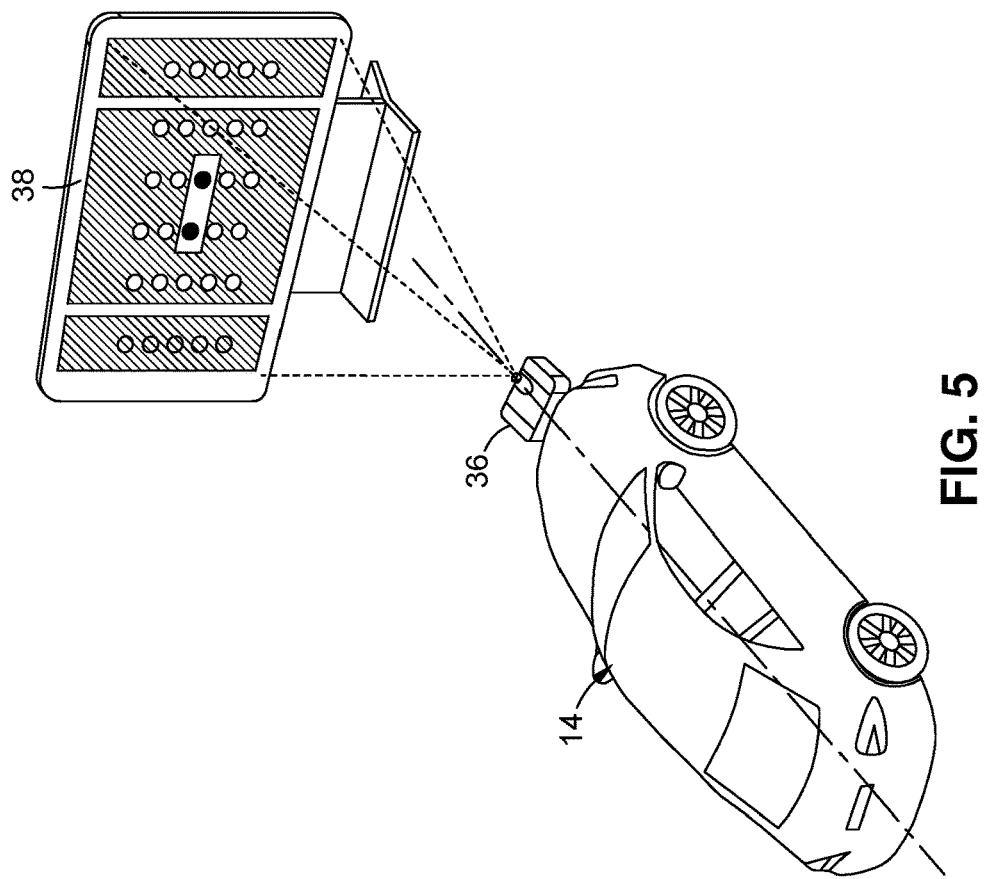
FIG. 5 is an upper perspective view of a vehicle undergoing calibration of a front ADAS sensor.

Referring now specifically to FIGS. 5-7, there is shown an exemplary depiction of a vehicle 14 undergoing calibration of a front ADAS sensor 12*a*. In this example, a projector 36 is projecting an image onto a screen 38 positioned in front of the vehicle 14. The image projected onto the screen 38 includes a pair of narrow quadrangular shapes on either side of a larger, central quadrangular shape. Each narrow quadrangle includes a single array of circles, while the central quadrangle includes four arrays of circles with a smaller quadrangle extending horizontally at the center of the larger quadrangle.

Figure 8:
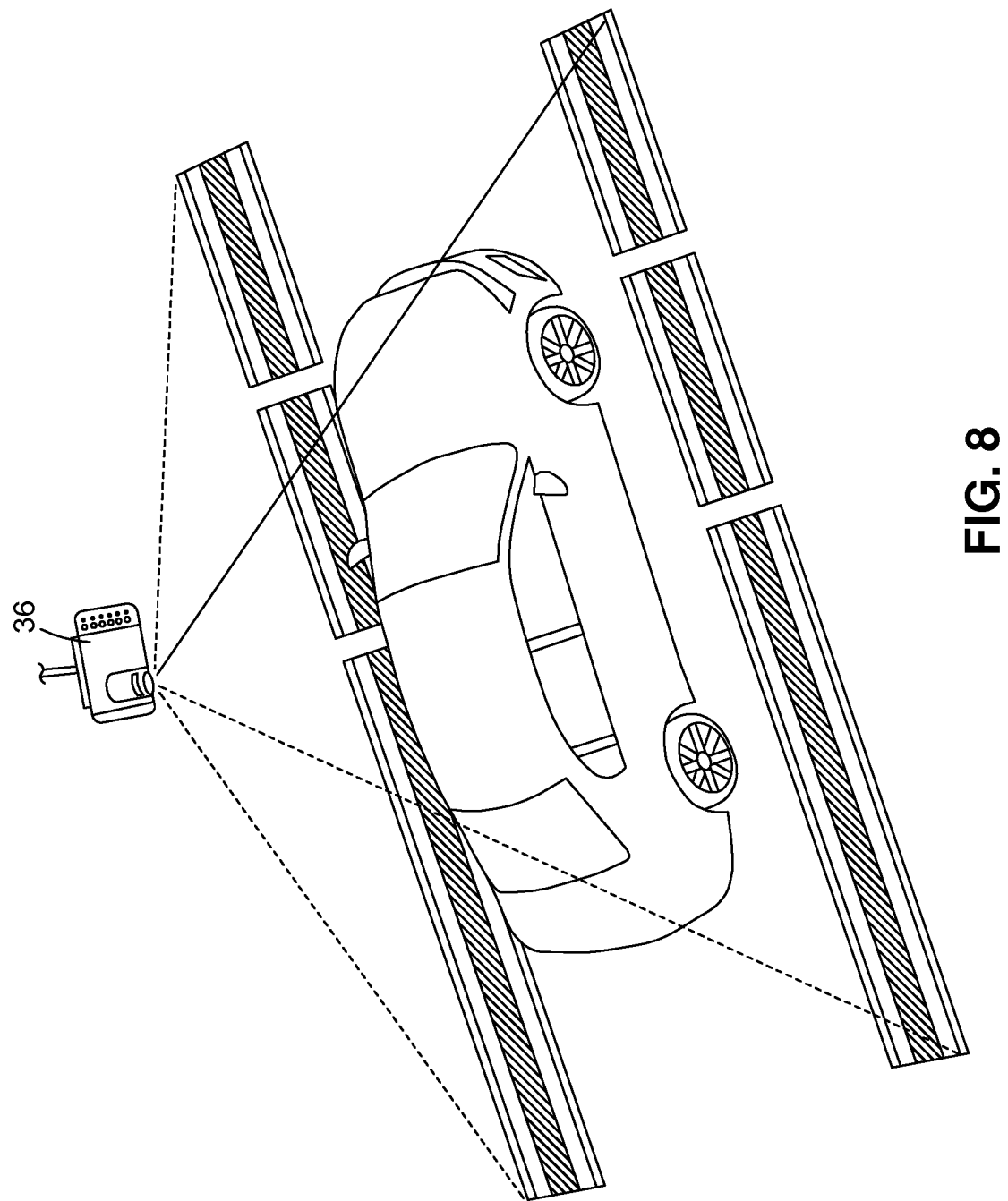
FIG. 8 is an upper perspective view of a vehicle undergoing calibration of a side ADAS sensor.
Figure 9:
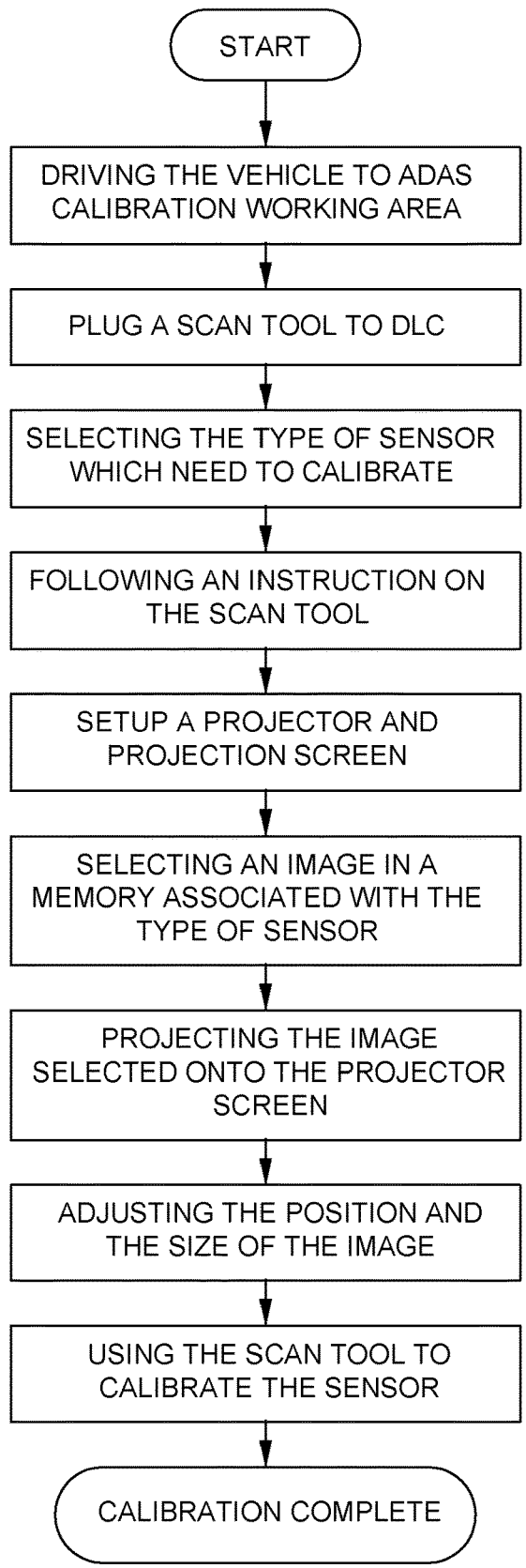
FIG. 9 is a flow chart of an exemplary methodology of calibrating an ADAS sensor on a vehicle.

Referring now specifically to FIG. 8, there is shown an exemplary depiction of a vehicle undergoing calibration of side ADAS sensors 12*b*, 12*c*. In this example, a projector 36 is projecting an image onto the ground on either side of the vehicle 14. Each image includes a strip, similar to a lane boundary, with each strip including a forward segment, an intermediate segment, and a rear segment.

Although the foregoing describes calibration of one or more ADAS sensors 12 based on selection by a user, or based on analysis of diagnostic data, it is contemplated that one or more ADAS sensors 12 may operate in concert with another ADAS sensor(s) 12. Indeed, some vehicle systems combine information from multiple sensors, a process referred to as sensor fusion, to obtain a more accurate understanding of what is happening in and around the vehicle. Accordingly, various aspects of the present disclosure are directed toward calibrating not only the selected ADAS sensor(s) 12, but also another ADAS sensor 12 that may be operatively associated with the selected ADAS sensor to facilitate a prescribed functionality. A secondary ADAS sensor 12 operatively associated with the selected ADAS sensor 12 may be identified and vehicle data associated with the secondary ADAS sensor may be analyzed to determine whether the secondary ADAS sensor meets a predetermined calibration parameter to determine whether calibration of the secondary ADAS sensor is required. It is also contemplated that certain ADAS sensors may be configured such that calibration of the selected ADAS sensor 12 may automatically trigger calibration of the secondary ADAS sensor(s) 12. Calibration instructions associated with the secondary ADAS sensor 12 may be displayed in response to receiving the user input or other selection of the selected ADAS sensor 12. A secondary image may be projected onto a secondary projection surface adjacent the vehicle 14. For instance, it is contemplated that the selected ADAS sensor may be a side sensor 12c positioned adjacent the rear, and the secondary ADAS sensor may be a rear sensor 12d. As such, the projection surface for the side sensor 12c may be the ground, and the projection surface of the rear sensor 12d may be a screen 38. Instructions on the handheld vehicle diagnostic tool 20 may be executed to calibrate the secondary ADAS sensor using the projected secondary image.

The secondary ADAS sensor may be associated with the selected ADAS sensor by proximity, e.g., adjacent the selected ADAS sensor 12 on the vehicle 14. It is also contemplated that the secondary ADAS sensor 12 may be identified as being associated with the selected ADAS sensor 12 due to data from the secondary ADAS sensor and the selected ADAS being collectively assessed to determine a specific vehicle parameter. For instance, the specific vehicle parameter may be a distance between the vehicle 14 and an adjacent object.

Figure 10:
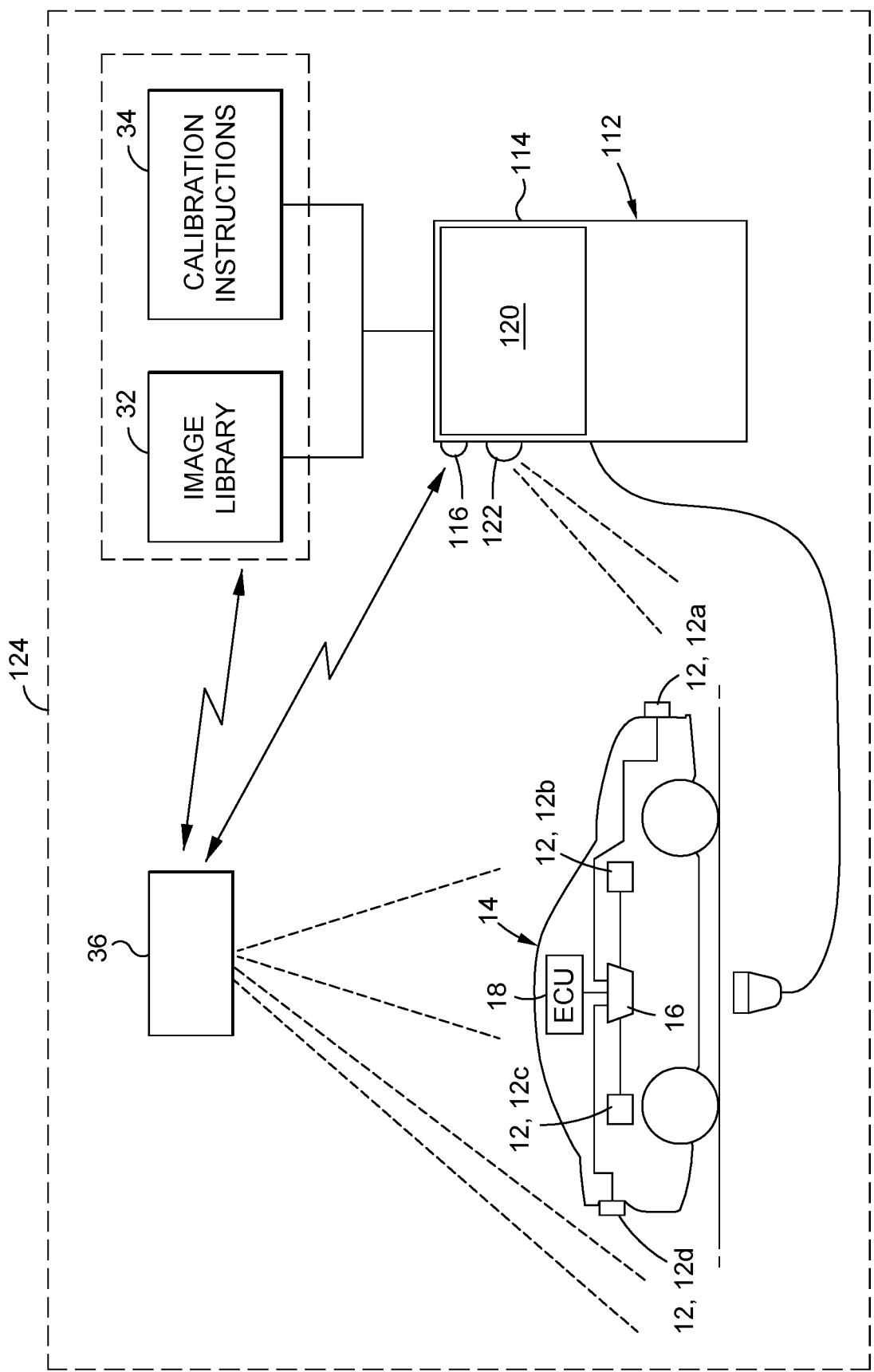
FIG. 10 is a schematic view of a system for calibrating an ADAS sensor on a vehicle using a diagnostic kiosk.

According to another embodiment of the present disclosure, and referring now specifically to FIG. 10, there is provided a kiosk-based system 110 for calibrating an ADAS sensor 12 on a vehicle 14. The kiosk-based system 110 may be deployed in a location that is routinely visited during operation of a vehicle, such as a car wash, gas station, parts store, shopping center parking lot, etc., to allow a user to quickly and easily check for ADAS sensors 12 that may need calibration, and easily perform any calibration that may be needed.

According to one embodiment, the system 110 includes a kiosk 112 having a housing 114 and a proximity sensor 116 coupled to the housing 114 and capable of detecting a position of the vehicle 14 relative to the proximity sensor 116. The kiosk 112 further includes a diagnostic connector 118 connected to the housing 114 and connectable with the vehicle 14 to communicate with an onboard vehicle computer 18 for receiving a list of ADAS sensors 12 from the vehicle 14. The diagnostic connector is further configured to transmit calibration commands to the onboard vehicle computer in response to receipt of the user input and the image being projected onto the projection surface. A user interface/display 120 is also coupled to the housing 114 and is configured to display the list of ADAS sensors 12 received from the vehicle 14, as well as receive user input identifying a selected ADAS sensor 12 from the list of ADAS sensors 12, and display calibration instructions associated with the selected ADAS sensor 12. A projector 122 is connected to the housing 114 and is configured to project an image onto a projection surface adjacent the vehicle 14, with the projected image being associated with calibrating the selected ADAS sensor 12. It is also contemplated that a separate projector 36 may be used, particularly to project images from directly above the vehicle 14.

The projector(s) 122, 36 used in the kiosk-based system may be configured to emit an image or sequence of images at a brightness level that is sufficient to conduct calibration in daylight, as may be the case when the kiosk 112 is deployed in an outside environment. Along these lines, the kiosk may include a shade or other structure to block direct sunlight to create a darker environment within which an image may be projected. The kiosk 112 may also be deployed in a garage bay, car port or within other structure 124 which may provide shade.

It is contemplated that the kiosk 112 may be a standalone structure, similar to a gas pump. It is also contemplated that the kiosk 112 may be integrated into an existing structure or building. For instance, the diagnostic connector 118, and any associated cable, may extend from an existing building. Furthermore, the display screen, projector, and proximity sensor may also be integrated into an existing building.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of calibrating an Advanced Driver Assistance System (ADAS) sensor on a vehicle, the method comprising the steps of:
   a) receiving a signal at a handheld vehicle diagnostic tool from an onboard vehicle computer, the signal including a list of ADAS sensors located on the vehicle;
   b) displaying the list of ADAS sensors on a display of the handheld vehicle diagnostic tool;
   c) receiving a user input on the handheld vehicle diagnostic tool identifying a selected ADAS sensor from the list of ADAS sensors displayed on the display;
   d) displaying calibration instructions associated with the selected ADAS sensor in response to receiving the user input;
   e) projecting an image onto a projection surface adjacent the vehicle, the projected image being associated with calibrating the selected ADAS sensor;
   f) executing computer executable instructions on the handheld vehicle diagnostic tool to calibrate the selected ADAS sensor using the projected image in response to receipt of the user input and projecting the image onto the projection surface;
   g) identifying, on the handheld vehicle diagnostic tool, a secondary ADAS sensor operatively associated with the selected ADAS sensor, the secondary ADAS sensor and the selected ADAS sensor both generating data that are collectively useful to determine a parameter of interest; and
   h) displaying calibration instructions associated with the secondary ADAS sensor;
   wherein steps d)-h) proceed autonomously in response to step c).

2. The method recited in claim 1, further comprising the steps of:
   receiving diagnostic data from the vehicle at the handheld vehicle diagnostic tool; and
   analyzing the diagnostic data to identify at least one ADAS sensor requiring calibration.

3. The method recited in claim 2, further comprising the step of visually displaying the at least one ADAS sensor requiring calibration on the handheld diagnostic tool.

4. The method recited in claim 1, wherein the projecting step includes projecting the image onto a projection surface adjacent a side of the vehicle.

5. The method recited in claim 1, wherein the projecting step includes projecting the image onto a projection surface adjacent a rear of the vehicle.

6. The method recited in claim 1, wherein the step of displaying calibration instructions includes displaying instructions associated with positioning of a projection screen relative to the vehicle.

7. The method recited in claim 1, wherein the step of displaying calibration instructions includes displaying instructions associated with displaying the image.

8. The method recited in claim 1, further comprising the step of selecting an image from an image library based on the selected ADAS sensor.

9. The method recited in claim 8, wherein the step of selecting an image occurs autonomously in response to receiving the user input on the handheld vehicle diagnostic tool identifying the selected ADAS sensor.

10. The method recited in claim 1, further comprising the step of generating a completion signal in response to the selected ADAS sensor meeting a prescribed calibration threshold.

11. The method recited in claim 1, wherein the selected ADAS sensor and an adjacent ADAS sensor are operable in concert with each other to facilitate a prescribed functionality, the method further comprising the step of analyzing vehicle data associated with the secondary ADAS sensor to determine whether the secondary ADAS sensor meets a predetermined calibration parameter.

12. The method recited in claim 1, further comprising the steps of:
projecting a secondary image onto a secondary projection surface adjacent the vehicle; and
executing computer executable instruction on the handheld vehicle diagnostic tool to calibrate the secondary ADAS sensor using the projected secondary image.

13. The method recited in claim 1, wherein the secondary ADAS sensor is adjacent the selected ADAS sensor on the vehicle.

14. The method recited in claim 1, wherein the secondary ADAS sensor is identified as associated with selected ADAS sensor due to data from the secondary ADAS sensor and the selected ADAS being collectively assessed to determine a specific vehicle parameter.

15. The method recited in claim 14, wherein the specific vehicle parameter is a distance between the vehicle and an adjacent object.

16. A system for calibrating an Advanced Driver Assistance System (ADAS) sensor on a vehicle, the system comprising:
a handheld automotive diagnostic device connectable with the vehicle to communicate with an onboard vehicle computer; and
a set of computer executable instructions downloadable onto the handheld automotive diagnostic device for configuring the handheld automotive diagnostic device to:
a) generate a request for a list of ADAS sensors from the vehicle;
b) receive a signal at the handheld vehicle diagnostic tool from an onboard vehicle computer, the signal including the list of ADAS sensors located on the vehicle;
c) display the list of ADAS sensors on a display of the handheld vehicle diagnostic tool;
d) receive a user input on the handheld vehicle diagnostic tool identifying a selected ADAS sensor from the list of ADAS sensors displayed on the display;
e) display calibration instructions associated with the selected ADAS sensor in response to receiving the user input;
f) generate a command signal for a projector to projecting an image onto a projection surface adjacent the vehicle, the projected image being associated with calibrating the selected ADAS sensor;
g) autonomously calibrate the selected ADAS sensor using the projected image in response to receipt of the user input and projecting the image onto the projection surface;
h) identifying, on the handheld vehicle diagnostic tool, a secondary ADAS sensor operatively associated with the selected ADAS sensor, the secondary ADAS sensor and the selected ADAS sensor both generating data that are collectively useful to determine a parameter of interest; and
i) displaying calibration instructions associated with the secondary ADAS sensor;
wherein steps e)-i) proceed autonomously in response to step d).

17. The system recited in claim 16, wherein the computer executable instructions further configure the handheld automotive diagnostic device to:
receive diagnostic data from the vehicle at the handheld vehicle diagnostic tool; and
analyze the diagnostic data to identify at least one ADAS sensor requiring calibration.

18. A kiosk for calibrating an Advanced Driver Assistance System (ADAS) sensor on a vehicle, the kiosk comprising:
a housing;
a proximity sensor coupled to the housing and capable of detecting a position of the vehicle relative to the proximity sensor;
a diagnostic connector connected to the housing and connectable with the vehicle to communicate with an onboard vehicle computer for receiving a list of ADAS sensors from the vehicle;
a projector connected to the housing and configured to project an image onto a projection surface adjacent the vehicle, the projected image being associated with calibrating a selected ADAS sensor;
the diagnostic connector further being configured to transmit calibration commands to the onboard vehicle computer in response to receipt of the user input and the image being projected onto the projection surface; and
a user interface coupled to the housing;
wherein the kiosk is configured to:
a) receive from the diagnostic connector a signal including a list of ADAS sensors located on the vehicle;
b) display the list of ADAS sensors on the user interface;
c) receive a user input on the user interface identifying the selected ADAS sensor from the list of ADAS sensors displayed;
d) display calibration instructions associate with the selected ADAS sensor in response to receiving the user input;
e) generate a command signal for the projector connected to the housing to project an image onto a projection surface adjacent to the vehicle, the projected image being associated with calibrating the selected ADAS sensor;

f) autonomously calibrate the selected ADAS sensor using the projected image in response to receipt of the user input and projecting the image onto the projection surface;

g) identifying a second ADAS sensor operative associated with the selected ADAS sensor, the secondary ADAS sensor and the selected ADAS sensor both generating data that are collectively useful to determine a parameter of interest; and h) displaying calibration instructions associated with the secondary ADAS sensor in response to receiving the user input;

wherein steps d)-h) proceed autonomously in response to step c).

19. The kiosk recited in claim 18, wherein the user interface is a touch screen display.

20. The method recited in claim 1, wherein the secondary ADAS sensor identified in the identifying step operates in concert with the selected ADAS sensor.

21. The method recited in claim 1, wherein the secondary ADAS sensor and the selected ADAS sensor collectively provide information to facilitate sensor fusion.

22. The method recited in claim 1, wherein the secondary ADAS sensor and the selected ADAS sensor collectively provide information to facilitate a prescribed functionality.

* * * * *